(12) United States Patent
Fiegler et al.

(10) Patent No.: US 6,893,146 B2
(45) Date of Patent: May 17, 2005

(54) LUMINAIRE FOR INSTALLING IN THE COVER CAP OF AN EXTERIOR REARVIEW MIRROR FOR MOTOR VEHICLES

(75) Inventors: Matthias Fiegler, Heidenheim (DE); Thomas Reiners, Bachhagel (DE)

(73) Assignee: Patent-Treuhand-Gesellschaft für Electrische Glühlampen mbH, Munich (DE)

(*) Notice: Subject to any disclaimer, the term of this patent is extended or adjusted under 35 U.S.C. 154(b) by 49 days.

(21) Appl. No.: 10/386,478

(22) Filed: Mar. 13, 2003

(65) Prior Publication Data

US 2003/0174507 A1 Sep. 18, 2003

(30) Foreign Application Priority Data

Mar. 13, 2002 (DE) .......................... 202 04 104

(51) Int. Cl.⁷ ................................. B60Q 1/26
(52) U.S. Cl. ...................... 362/494; 362/223; 362/540; 340/475
(58) Field of Search ................. 362/494, 511, 362/540, 140, 223; 340/475

(56) References Cited

U.S. PATENT DOCUMENTS

| | | | | |
|---|---|---|---|---|
| 5,823,654 A | * | 10/1998 | Pastrick et al. ............. | 362/494 |
| 5,938,322 A | * | 8/1999 | Alonzo et al. .............. | 362/494 |
| 6,099,153 A | * | 8/2000 | Zimmermann et al. ...... | 362/494 |
| 6,271,750 B1 | | 8/2001 | Bräutigam et al. | |
| 6,315,437 B1 | * | 11/2001 | Katz et al. .................. | 362/494 |
| 6,325,517 B1 | * | 12/2001 | Kuo ........................... | 359/838 |
| 6,354,723 B1 | * | 3/2002 | Spence ....................... | 362/540 |
| 6,502,970 B1 | * | 1/2003 | Anderson et al. ........... | 362/494 |
| 6,685,325 B1 | * | 2/2004 | Hulse et al. ................. | 359/879 |
| 2001/0024371 A1 | * | 9/2001 | Pastrick et al. ............. | 362/494 |
| 2003/0122664 A1 | * | 7/2003 | Liu ............................. | 340/475 |
| 2003/0193815 A1 | * | 10/2003 | Mishimagi .................. | 362/522 |

FOREIGN PATENT DOCUMENTS

DE          199 33 724 A1          1/2001

* cited by examiner

Primary Examiner—Thomas M. Sember
Assistant Examiner—Jacob Y. Choi
(74) Attorney, Agent, or Firm—William E. Meyer

(57) ABSTRACT

A luminaire for installing in the cover cap of an exterior rearview mirror for motor vehicles, has a luminaire housing and an electrical lamp arranged therein. The housing is entirely or partly of transparent design, such that in the installed state light exit surfaces of the housing are arranged both on the front side and on the rear side of the exterior rearview mirror. The lamp has a tubular, sealed lamp vessel, at least a portion of the lateral surface of the lamp vessel and an end face of the lamp vessel being of transparent design. Light directing elements for focusing the light emerging from the lateral surface and for deflecting the light emerging from the end face are provided such that the light emerging from the end face is directed toward a light exit surface arranged opposing the light emerging from the lateral surface.

5 Claims, 1 Drawing Sheet

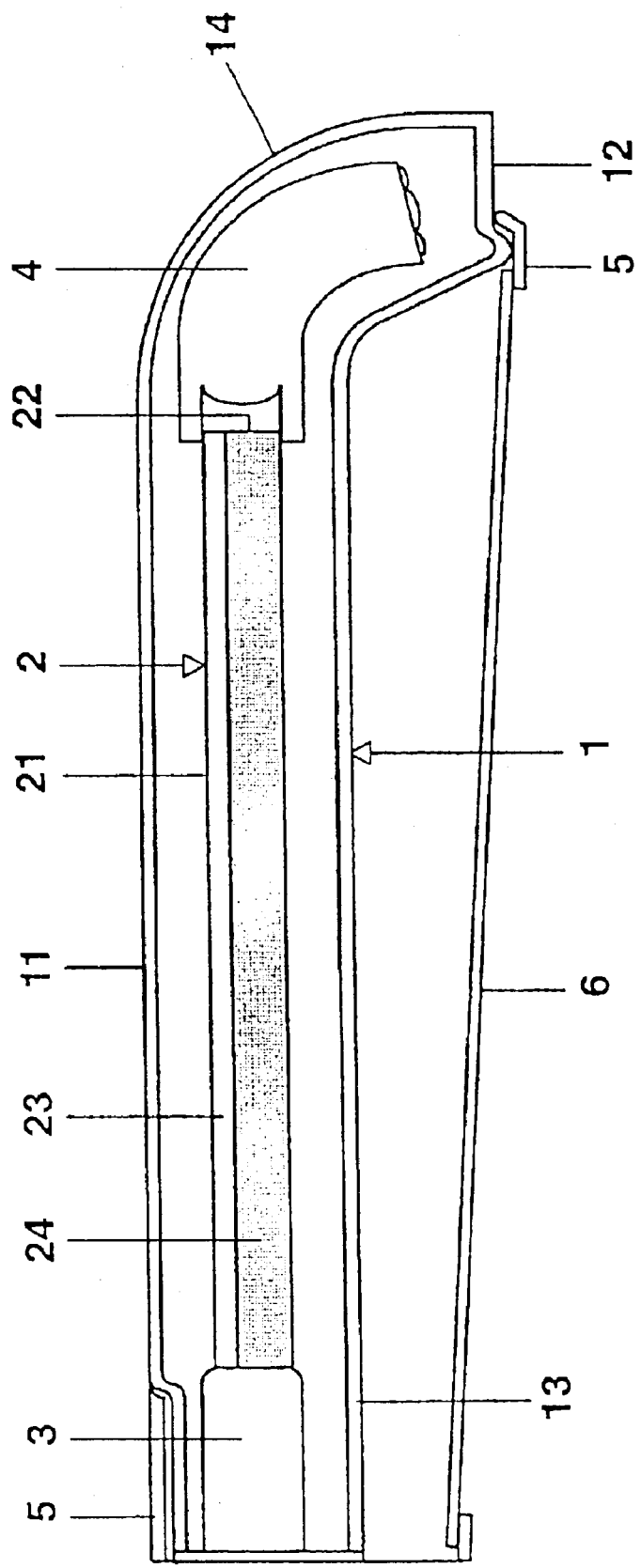

LUMINAIRE FOR INSTALLING IN THE COVER CAP OF AN EXTERIOR REARVIEW MIRROR FOR MOTOR VEHICLES

I. TECHNICAL FIELD

The invention relates to a luminaire for installing in the cover cap of an exterior rearview mirror for motor vehicles having a luminaire housing and an electrical lamp arranged therein, the luminaire housing being entirely or partly of transparent design, such that in the installed state light exit surfaces of the luminaire housing are arranged both on the front side and on the rear side of the exterior rearview mirror.

II. BACKGROUND ART

Such a luminaire is disclosed, for example, in German laid-open patent application DE 199 33 724 A1. This document describes a side flasher luminaire for installing in the cover cap of an exterior rearview mirror for motor vehicles. The side flasher luminaire has a luminaire housing with a plurality of lamps and reflectors arranged therein, in order to focus the light emitted by the lamps into the main direction of emission. The main direction of emission of the light emitted by the lamps is the rear side of the exterior rearview mirror pointing in the driving direction. In addition, the side flasher luminaire has a further lamp with a reflector in order to direct light toward the front side of the exterior rearview mirror such that the side flasher luminaire also emits light counter to the driving direction that is visible from positions behind the vehicle.

III. DISCLOSURE OF THE INVENTION

It is the object of the invention to provide an electric luminaire for installing in the housing of an exterior rearview mirror for motor vehicles that manages with as few light sources as possible and whose light is visible both in positions that lie in front of the vehicle and positions that lie behind the vehicle.

This object is achieved according to the invention by a luminaire for installing in the cover cap of an exterior rearview mirror for motor vehicles, having a luminaire housing and an electrical lamp arranged therein, said luminaire housing being entirely or partly of transparent design, such that in the installed state light exit surfaces of the luminaire housing are arranged both on the front side and on the rear side of said exterior rearview mirror, wherein the lamp has a tubular, sealed lamp vessel, at least a portion of the lateral surface of the lamp vessel and an end face of the lamp vessel being of transparent design, and light directing means for focusing the light emerging from said lateral surface and for deflecting the light emerging from said end face being provided such that the light emerging from the end face is directed toward a light exit surface arranged opposing the light emerging from the lateral surface.

Particularly advantageous designs of the invention are described in the subclaims.

The luminaire according to the invention is provided for installing in the cover cap of an exterior rearview mirror for motor vehicles and has a luminaire housing that is entirely or partly of transparent design and has an electric lamp arranged therein such that in the installed state light exit surfaces of the luminaire housing are arranged both on the front side and on the rear side of the exterior rearview mirror. According to the invention, the lamp has a tubular, sealed lamp vessel, at least a portion of the lateral surface of the lamp vessel and an end face of the lamp vessel being of transparent design, and the luminaire has light directing means for focusing the light emerging from the lateral surface and for deflecting the light emerging from the end face such that the light emerging from the end face is directed toward a light exit surface arranged opposing the light emerging from the lateral surface.

Owing to the abovementioned properties of the luminaire according to the invention, it is achieved with only a single lamp that the luminaire emits light both in the driving direction of the vehicle and counter to the driving direction. In particular, the luminaire according to the invention can therefore be perceived both by oncoming vehicles and by following vehicles.

The light directing means advantageously comprise an optical conductor arranged on the end face of the lamp vessel, because it is possible with the aid of said optical conductor to deflect the light emerging from the end face of the lamp vessel with low losses. The light directing means also advantageously comprise a reflecting coating that is applied to the lateral surface of the lamp vessel such that a transparent aperture extending in the longitudinal direction is formed on the lateral surface, in order to direct the light emerging from the lateral surface in the direction of a light exit surface of the luminaire. The reflecting coating converts the lamp into an aperture lamp such as is known from copiers, and permits the light emerging through the aperture from the lateral surface to be focused into the main direction of emission of the luminaire pointing in the driving direction of the motor vehicle.

The luminaire according to the invention is preferably designed as a direction indicator or as a parking luminaire. It contributes in these functions to improving traffic safety, since it is arranged in the exterior rearview mirror and thus at an exposed position in the motor vehicle.

IV. BEST MODE FOR CARRYING OUT OF THE INVENTION

The invention is explained in more detail below with the aid of a preferred exemplary embodiment.

The FIGURE shows a highly schematic longitudinal view through the preferred exemplary embodiment of the luminaire according to the invention and its arrangement in the right-hand exterior rearview mirror of a motor vehicle. This luminaire is designed as a direction indicator and has a luminaire housing 1 made from a transparent, orange colored plastic, a discharge lamp 2 with a tubular vitreous lamp vessel, a holder 3 for the discharge lamp 2 and an optical conductor 4. The luminaire housing 1 is adapted to the outer contour of the cover cap 5 of the exterior rearview mirror such that the luminaire can be inserted into a corresponding cutout in the cover cap 5, as is described, for example, in the laid-open patent application DE 199 33 724 A1. The mirror surface 6 of the exterior rearview mirror is also depicted schematically in the figure in order to illustrate the arrangement of the luminaire according to the invention. The luminaire housing 1 has a light exit surface 11 arranged on the front side of the exterior rearview mirror, and a light exit surface 12 arranged on the rear side of the exterior rearview mirror. The light exit surface 11 pointing in the driving direction of the motor vehicle and arranged on the front side of the exterior rearview mirror forms the main direction of light emission of the luminaire. The luminaire housing 1 has an end 13 facing the vehicle body in which the holder 3 for the discharge lamp 2 is mounted, and an end 14 averted from the vehicle body that is of curved design and which has the light exit surface 12 arranged on the rear side of the exterior rearview mirror. The discharge lamp 2 is an excimer lamp with a base on one end and filled with xenon, in which a dielectrically impeded gas discharge is used to generate UV radiation that is converted into light by means of phosphors. The discharge lamp 2 is also designed as an aperture lamp. The aperture 23 is produced by means of an optically reflecting coating 24 on the lateral surface 21 of the lamp vessel. The aperture 23 extends in the longitudinal direction on the lateral surface 21 and faces the light exit surface 11 of the lamp housing 1. The lamp vessel has a transparent end face 22 at the end of the lamp 2 facing away from the holder 3. The light emerging from the end face 22 is directed to the light exit surface 12 of the luminaire housing 1 by means of the optical conductor 4. The optical conductor 4 is arranged for this purpose on the end face 22 and bent in the direction of the light exit surface 12. The luminaire or the lamp 2 arranged in the luminaire is supplied with energy by the motor vehicle network via the connection of the exterior rearview mirror to the vehicle body (not depicted).

What is claimed is:

1. A luminaire for installing in the cover cap of an exterior rearview mirror for motor vehicles, having a front side and a rear side, the luminaire comprising:
    a luminaire housing and an electrical lamp arranged therein, said luminaire housing being entirely or partly of transparent design, such that in the installed state light exit surfaces of the luminaire housing are arranged both on the front side and on the rear side of the exterior rearview mirror, wherein
    said lamp has a tubular, sealed lamp vessel, at least a portion of the lateral surface of the lamp vessel and an end face of the lamp vessel being of transparent design, and
    light directing means for focusing the light emerging from said lateral surface and for deflecting the light emerging from said end face being provided such that the light emerging from the end face is directed toward a light exit surface arranged opposing the light emerging from the said lateral surface.

2. The luminaire as claimed in claim 1, wherein the light directing means comprises an optical conductor arranged on the end face of the lamp vessel.

3. The luminaire as claimed in claim 1, wherein the light directing means comprises a reflecting coating applied to the lateral surface of the lamp vessel with a transparent aperture extending in the longitudinal direction formed on the lateral surface, directing the light emerging from the lateral surface in the direction of a light exit surface of the luminaire.

4. The luminaire as claimed in claim 1, wherein the luminaire is a direction indicator.

5. The luminaire as claimed in claim 1, wherein the luminaire is a parking luminaire.

* * * * *